(12) United States Patent
Jordan et al.

(10) Patent No.: US 12,334,716 B1
(45) Date of Patent: Jun. 17, 2025

(54) PULLING EYE FOR PULLING A MICRO-CONDUIT THROUGH A CONDUIT OF LARGER DIAMETER

(71) Applicants: David S. Jordan, Knoxville, TN (US); Michael C. Jordan, Knoxville, TN (US); Scott M. Jordan, Knoxville, TN (US)

(72) Inventors: David S. Jordan, Knoxville, TN (US); Michael C. Jordan, Knoxville, TN (US); Scott M. Jordan, Knoxville, TN (US)

(73) Assignee: iTool Equipment Holding LLC, Clinton, TN (US)

( * ) Notice: Subject to any disclaimer, the term of this patent is extended or adjusted under 35 U.S.C. 154(b) by 260 days.

(21) Appl. No.: 18/445,161

(22) Filed: May 4, 2023

Related U.S. Application Data

(60) Provisional application No. 63/473,188, filed on May 6, 2022.

(51) Int. Cl.
*H02G 1/08* (2006.01)
*H02G 3/04* (2006.01)
*H02G 3/38* (2006.01)

(52) U.S. Cl.
CPC ........... *H02G 1/081* (2013.01); *H02G 3/0481* (2013.01); *H02G 3/28* (2013.01)

(58) Field of Classification Search
CPC ......... H02G 1/081; H02G 3/0481; H02G 3/28
USPC ........................................................ 174/68.1
See application file for complete search history.

(56) References Cited

U.S. PATENT DOCUMENTS

| | | | |
|---|---|---|---|
| 4,460,159 A * | 7/1984 | Charlebois | H02G 1/081 385/100 |
| 8,961,061 B2 * | 2/2015 | Wahlberg | F16G 11/08 403/275 |
| 10,027,097 B1 * | 7/2018 | Jordan | G02B 6/4465 |

* cited by examiner

*Primary Examiner* — Timothy J Thompson
*Assistant Examiner* — Michael F McAllister
(74) *Attorney, Agent, or Firm* — Michael E. McKee

(57) ABSTRACT

A pulling eye for use when pulling conduit, comprised for example of polyethylene, of relatively small diameter, such as a micro-conduit, through a conduit of larger diameter includes an elongated body having a head end and an externally-threaded tapered section opposite the head end which, when threaded into one end of the conduit of relatively small diameter effects the biting of the external threads of the tapered section into the interior walls of the conduit of relatively small diameter. The head end of the pulling eye is configured to cooperatively interfit with the working end of a rotating power tool to facilitate the attachment of the pulling eye to and the removal of the pulling eye from the conduit of relatively small diameter.

11 Claims, 3 Drawing Sheets

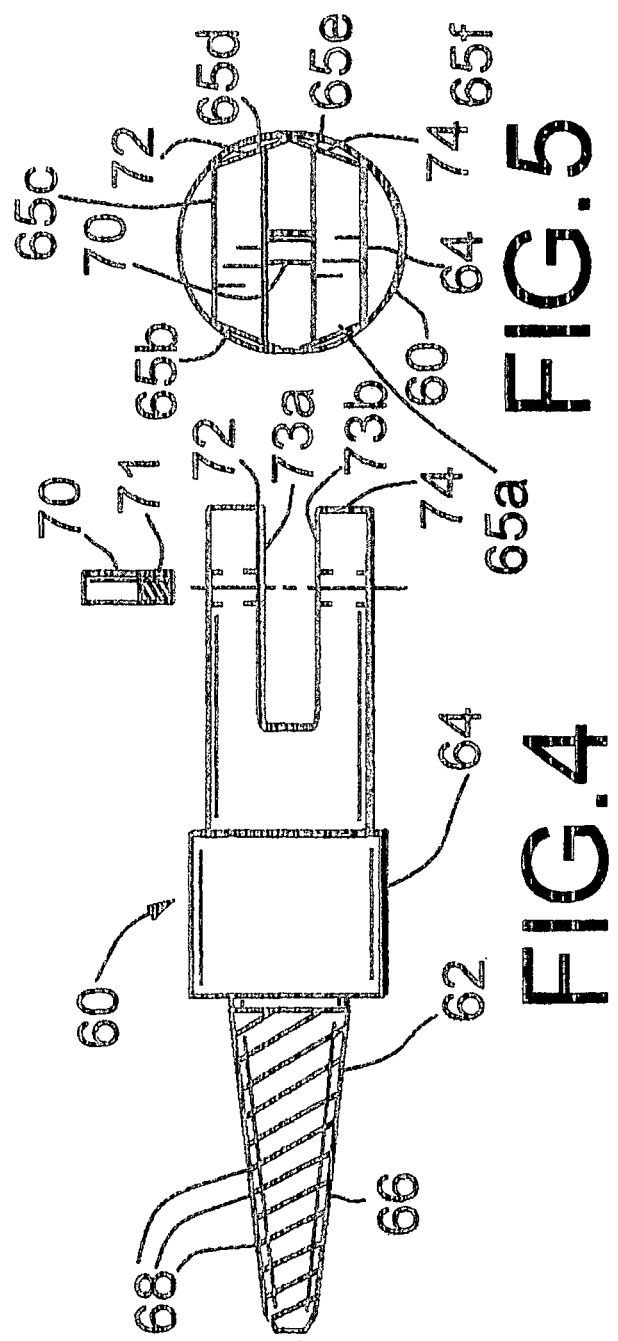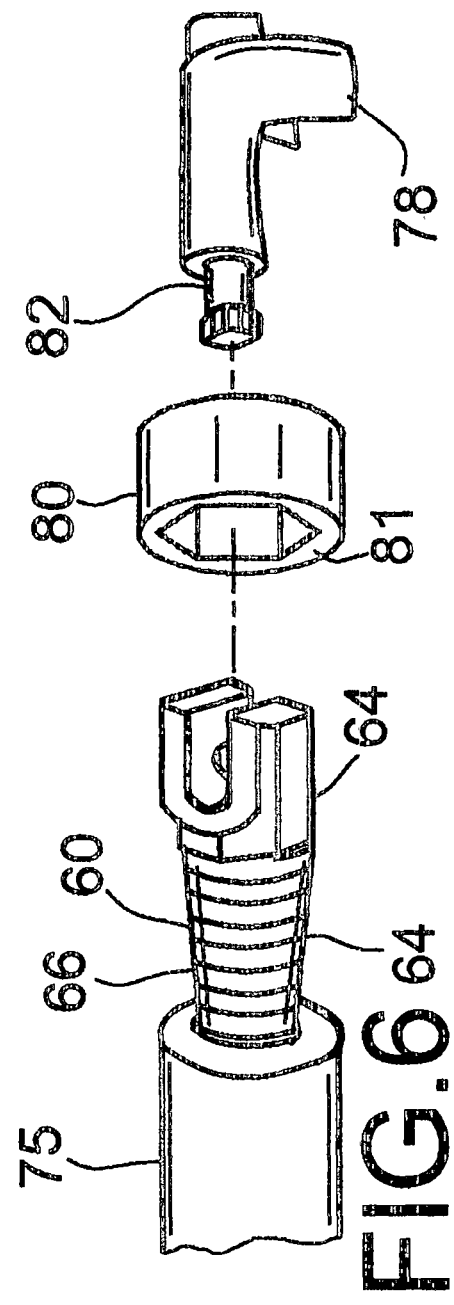

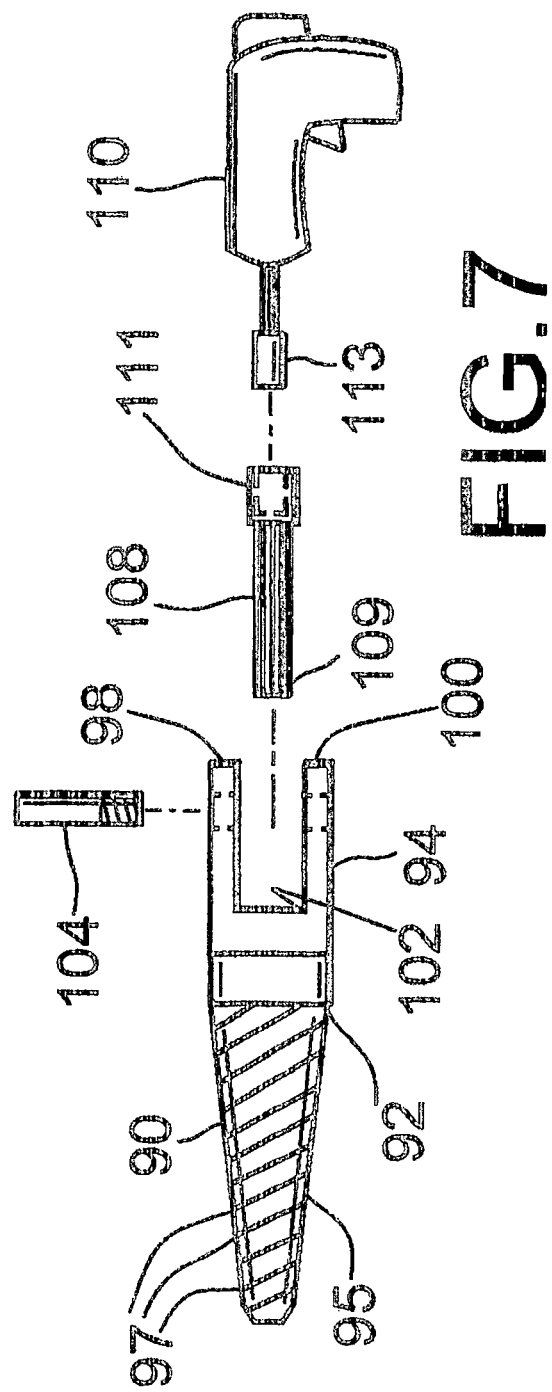
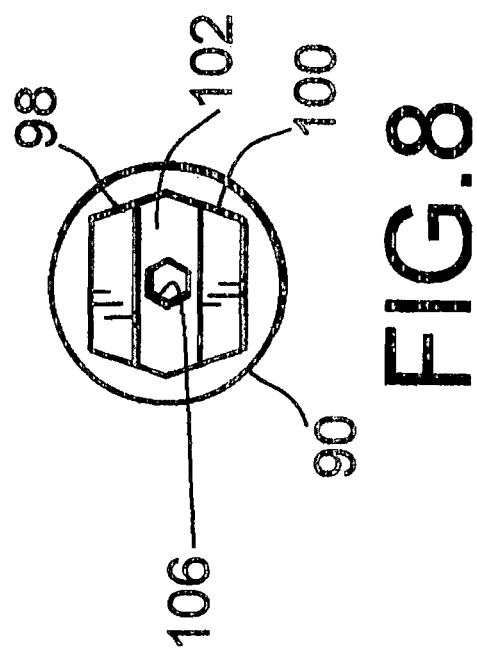

PULLING EYE FOR PULLING A MICRO-CONDUIT THROUGH A CONDUIT OF LARGER DIAMETER

The benefit of Provisional Application Ser. No. 63/473,188, filed May 6, 2022 and entitled PULLING EYE FOR PULLING A MICRO-CONDUIT THROUGH A CONDUIT OF LARGER DIAMETER, is hereby claimed. The disclosure of this referenced provisional application is incorporated herein by reference.

BACKGROUND OF THE INVENTION

This invention relates generally to tools used for pulling a polyethylene conduit of relatively small diameter through a conduit of larger diameter and relates, more particularly, to a pulling eye which is securable to such a small-diameter conduit for purposes of pulling the conduit through the larger-diameter conduit.

A pulling eye, referred in the art as a carrot, is known which includes a clevis-shaped head at one end thereof and screw-in tapered threads at the opposite end which are designed to grip the interior wall of a polyethylene conduit when screwed into an end of the conduit. Commonly, the tapered end of such a pulling eye is provided with cutting edges which effectively cut a thread into the interior wall of the conduit when screwed, or threadably rotated, into an end of the polyethylene conduit. Such a threading of the tapered threads of the pulling eye into the polyethylene conduit helps to ensure a reliable grip of the puling eye upon the conduit to reduce the likelihood that the pulling eye will separate from, or pull out of, the end of the conduit as the head end of the pulling eye is pulled upon to pull the conduit through a conduit of larger diameter.

Heretofore, the head of such a pulling eye is provided with a pair of spaced-apart bifurcations, or tangs, and a pin which extends transversely through, so as to join, the pair of tangs. In order to screw the tapered end of the pulling eye into an end of a conduit, an elongated tool, such as the shank of a screwdriver, is inserted between the tangs of the clevis-shaped head and manually manipulated (e.g. rotated) to twist the pulling eye about its longitudinal axis so that the tapered end of the pulling eye is advanced, by way of its threads, into the end of the conduit. In order to remove the pulling eye from the end of the conduit following a conduit-pulling operation, an elongated tool is again inserted between the tangs of the clevis-shaped head and twisted in the opposite rotational direction to unscrew the pulling eye from the conduit. Such a manual twisting of the pulling eye about its longitudinal axis during both installation and subsequent removal of the pulling eye can be time-consuming and arduous processes.

It would be desirable to provide a new and improved pulling eye for use when pulling a polyethylene conduit through a conduit of larger diameter and whose threaded end is capable of being screwed into place with a rotating power tool, such as an impact wrench.

Another object of the present invention is to provide such a pulling eye having a head which is capable of being cooperatively connected to the driving, or working, end of a rotating power tool for rotation of the pulling eye with the power tool.

Yet another object of the present invention is to provide such a pulling eye whose head is shaped to accept a socket tool positioned thereabout.

A further object of the present invention is to provide such a pulling eye whose head includes a recess for accepting the working end of an allen head wrench.

A still further object of the present invention is to provide such a pulling eye which is uncomplicated in structure, yet effective in operation.

SUMMARY OF THE INVENTION

This invention resides in a pulling eye for use when pulling polyethylene conduit of relatively small diameter through a conduit of larger diameter. The pulling eye includes an elongated body having a head end and an externally-threaded tapered section opposite the head end which, when threaded into an end of the conduit of small diameter, effects the biting of the external threads of the tapered section into the interior walls of the conduit of small diameter. The head end of the pulling eye is configured to cooperatively interfit with the working end of a rotating power tool to facilitate the attachment of the pulling eye to and the removal of the pulling eye from the conduit of small diameter.

BRIEF DESCRIPTION OF THE DRAWINGS

FIG. 4 is a view like that of FIG. 1 of a pulling eye within which features of the present invention are embodied.

FIG. 5 is an end elevation view of the FIG. 4 pulling eye as seen from the right in FIG. 4.

FIG. 6 is a perspective view of the pulling eye and conduit of FIG. 4 shown in condition for accepting a socket tool capable of being rotated by way of a rotating power tool.

FIG. 7 is a side elevation view of an alternative pulling eye within which features of the present invention are embodied.

FIG. 8 is an end elevation view of the FIG. 7 pulling eye as seen from the right in FIG. 7.

DETAILED DESCRIPTION OF AN ILLUSTRATIVE EMBODIMENT

Figure 1:
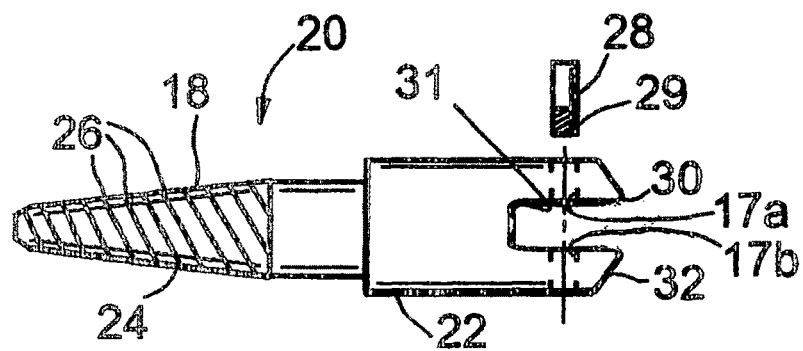
FIG. 1 is a side elevation view of a pulling eye, shown exploded, of the prior art used for pulling a conduit of small diameter through a conduit of larger diameter.
Figure 2:
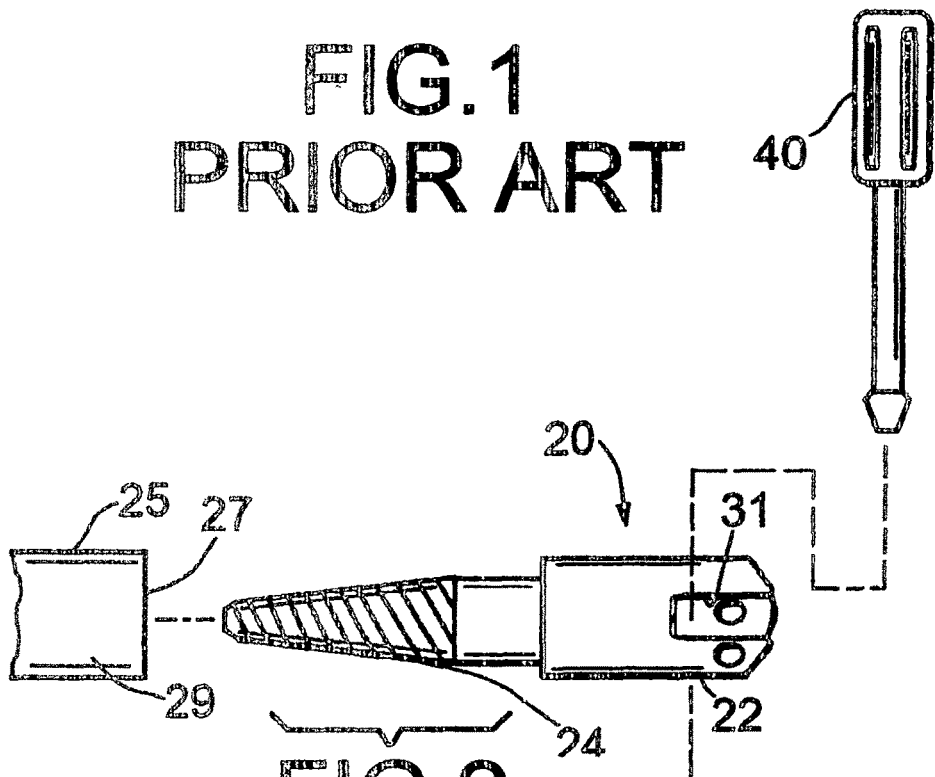
FIG. 2 is a side elevation view of the FIG. 1 . . . pulling eye shown in position for acceptance by one end of a conduit for conduit-pulling purposes and a tool used for manually screwing, or twisting, the pulling eye into the one end of the conduit.
Figure 3:
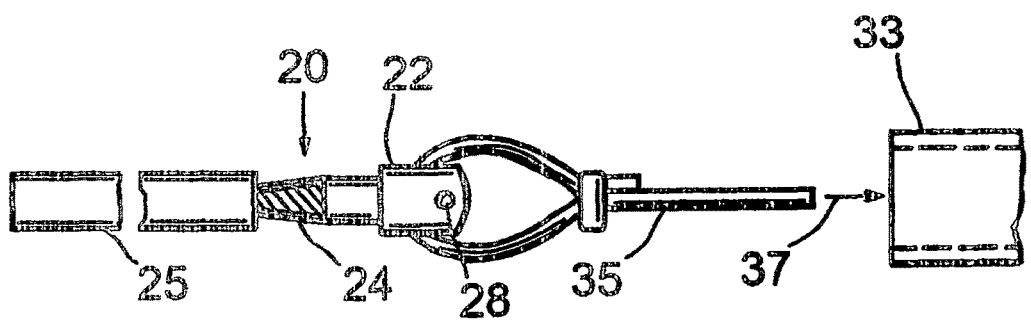
FIG. 3 is a side elevation view illustrating the FIG. 2 conduit being secured to the FIG. 2 pulling eye for pulling of the FIG. 2 conduit though a conduit of larger diameter.

Turning now to the drawings in greater detail and considering first FIGS. 1-3, there is illustrated an embodiment, generally indicated 20, of a pulling eye of the prior art shown in position for acceptance by an end of a conduit 25 (FIG. 2) of relatively small diameter (e.g. a micro-conduit) desired to be pulled through a conduit 33 (FIG. 3) of larger diameter. Briefly, the pulling eye 20 includes an elongated body 18 having a clevis-shaped head 22 at one end thereof and a tapered end 24 opposite the head 22 which possesses a plurality of external threads 26 which spiral and extend along its outer surface. Associated with the clevis-shaped head 22 is a pin 28 which extends through aligned openings 17a and 17b formed within the spaced-apart tangs, indicated 30, 32 of the clevis-shaped head 22. One end 29, or the lower end of the pin 28 as shown in FIG. 1, is externally threaded to mate with corresponding threads formed within the opening 17b of the tang 32.

The external threads 26 of the tapered end 24 are designed to effectively cut, or bite into, the interior wall of the FIG. 2 conduit 25 when screwed into, or threaded within, an open end, indicated 23 in FIG. 2, of the conduit. 25. Such a screwing of the pulling eye 20 into the open end 27 of the conduit 25 effects the cutting of the threads 26 along the interior wall, indicated 29, of the conduit 25 to enhance the grip between the pulling eye 20 and the conduit 25 so that when the conduit 25 is subsequently pulled through the conduit 33 of larger diameter by way of the clevis-shaped head 22 of the pulling eye 20, the conduit 25 is less likely to separate from, or be pulled free from, the pulling eye 20.

Heretofore and with reference still to FIG. 2, the pulling eye 20 has been manually screwed into the open end 25 of the conduit 25 with an elongated tool, such as the shank of a screwdriver 40, which is inserted through the space, indicated 31, provided between the tangs 30, 32 of the clevis-shaped head 22 of the pulling eye 20, and the tool 40 is subsequently twisted (e.g. manually) about the longitudinal axis of the pulling eye 20 and in an appropriate rotational direction thereabout (e.g. a clockwise direction with respect to the open end 27 of the conduit 25 into which the pulling eye 20 is initially directed) so that the tapered end 24 of the pulling eye 20 is threadably accepted by the interior of the conduit 25.

The conduit 25 of smaller diameter is commonly comprised of polyethylene (and is referred to in the art as a micro-conduit), while the pulling eye 20 is constructed of steel so that the forced rotation, or threading, of the tapered end 24 of the pulling eye 20 longitudinally into the end of the conduit 25 effects the aforedescribed cutting of the polyethylene material of the conduit 25 by the threads 26 of the tapered end 24 of the pulling eye 20.

An example of a pulling eye 20 as aforedescribed is available from Spartan Tool of Mendota, Illinois under Catalog Part No. 82000410. This referenced pulling eye 20 which is available from Spartan Tool is referred to by Spartan Tool as a carrot puller whose threaded end is tapered between one-half inches in diameter as measured across the tip thereof to one inch in diameter as measured adjacent the head 22, but carrot pullers of alternative sizes are available.

Once the tapered end 24 of the pulling eye 20 has been threadably accepted by the open end 27 of the conduit 25 to a satisfactory depth (e.g. to a depth of at least seven threads of the tapered end 24), the conduit 25 is suitably secured to the pulling eye 20 for an operation involving the pulling of the conduit 25 by the clevis-shaped head 22 of the pulling eye 20 through a second conduit, indicated 33 in FIG. 3 and also constructed of polyethylene, of larger diameter. To this end and with reference still to FIG. 3, a pulling cord 35 is looped, or otherwise tied, to the pin 28 of the clèvis-shaped head 22 of the pulling eye 20, and the cord 35 is subsequently pulled in the direction of the FIG. 3 arrow 37 so that the pulling eye 20 leads the conduit 25 endwise into and through the conduit 33 of larger diameter. Upon completion of the conduit-pulling operation (characterized by the exposure, or accessibility, of the pulling eye 20 at the opposite, or distal, end of the conduit 33 through which the pulling eye 20 (and conduit 25) is pulled, the pulling eye 20 is withdrawn, or freed, from the conduit 25 by manually twisting, or rotating, the pulling eye 20 in the appropriate rotational direction (e.g. a counter-clockwise direction relative to the end of the conduit 33 into which the pulling eye 20 is first directed) so that the pulling eye 20 is unscrewed, and thus withdrawn from, the conduit 25.

With reference to FIG. 4, there is depicted a pulling eye, generally indicated 60, within which features of the present invention are incorporated. Briefly, the pulling eye 60 includes an elongated body 62 having a clevis-shaped head end 64 and a tapered end section 66 opposite the head end 64 which possesses a plurality of external threads 68 which spiral and extend along the outer surface thereof. Associated with the clevis-shaped head end 64 is a pin 70 which extends through aligned openings 73a and 73b provided through the spaced-apart tangs, indicated 72, 74, of the clevis-shaped head end 66. Each tang 72 or 74 extends longitudinally of the elongated body 62 and—in a direction opposite the tapered section 66. Meanwhile, the end 71, or the lower end as viewed in FIG. 4, of the pin 70 is externally threaded to mate with corresponding threads formed within the opening 73b of the tang 74.

It is a feature of the body 62 of the pulling eye 60 that its head end 64 is configured to cooperatively interfit with the working end of a rotating power tool capable of rotating the elongated body 62 about its longitudinal axis. To this end, the circumferential surfaces of the head end 64 of the depicted pulling eye 60 are shaped, or otherwise formed, to provide the head end 64 with six outwardly-facing side surfaces 65a-65f arranged to collectively accept the open working end, indicated 81 in FIG. 6, of a standard socket 80 (FIG. 6) directed axially thereover. As will be apparent herein, when the socket 80 is mounted upon the rotatable shaft 82 of a rotatable power tool, such as an impact wrench 78 of FIG. 6, the tapered end 64 of the pulling eye 60 can be rotated by way of the socket 80 and power tool 78 about the longitudinal axis of the elongated body 62. Thus, by directing the tip of the tapered end 64 of the pulling eye 60 into the conduit, indicated 75 in FIG. 6, and then energizing the power tool 78 to appropriately rotate the socket 80 and pulling eye 60 about the longitudinal axis of the pulling eye 60 (e.g. in a clockwise direction thereabout), the tapered end 64 of the pulling eye 60 is threadably urged into the open end of the conduit 75 while the threads of the elongated body 62 bite into the interior walls of the conduit 75 to threadably join the conduit 75 to the pulling eye 60. When threadably joined to the conduit 75 (wherein the pulling eye 60 is accepted by the conduit 75 to a depth of at least seven threads 68), the pulling eye 60 is in a condition to enable the pulling eye 60 to be pulled through a conduit, such as the conduit 33 of FIG. 3, which possesses a slightly larger diameter than the conduit 75 desired to be pulled through the conduit 33.

If desired, a torque-limiting device, such as a clutch (not shown) can be mounted upon the rotatable shaft 82 of the FIG. 6 impact wrench 78 (and disposed in-line between the shaft 82 and socket 80) to limit the depth, or distance, into the end of the conduit 75, that the power tool 78 is permitted to advance the tapered end 66 of the pulling eye 60 into the end of the conduit 75.

Upon threading of the tapered end 66 of the pulling eye 60 into the open end of the conduit 75 to a satisfactory depth (e.g. of at least seven threads in depth) and with reference still to FIG. 6, the pulling eye 60 is suitably secured to the conduit 75 (as the threads 68 of the pulling eye 60 bite into, and thus grip, the interior walls of the conduit 75). At that point, the clevis-shaped head end 64 of the pulling eye 60 is joined to a pulling cord (such as the pulling cord 25 of FIG. 3) for pulling the pulling eye 60, with the conduit 75 secured thereto, through a conduit (e.g. the FIG. 3 conduit 33) of larger diameter. Upon completion of the pull of a conduit 75 through a conduit of larger diameter (which would expose the pulling eye 60 at the distal end of the conduit through which the pulling eye 60 is being pulled), the socket 80 can be repositioned about the six-sided head end 64 of the pulling eye 60 and threadably withdrawn, or unscrewed from, the conduit 75 by way of the power tool 78 as the pulling eye 60 is rotated in the opposite rotational direction (e.g. in a counter-clockwise direction) about the longitudinal axis of the pulling eye 60.

It follows that a pulling eye 60 has been described as having a head end 62 which is configured to cooperatively interfit with the working end (e.g. a socket 80) of a power tool 78 to enable the threaded end 66 of the pulling eye 60 to be screwed into or unscrewed from the end of a conduit 75 (e.g. the micro-conduit 25 of FIG. 3) by way of the power tool 78 and in a manner which is much less tedious and laborious than is the case with a manually-twistable tool, such as the screwdriver 40 of FIG. 2.

It will be understood that numerous modifications and substitutions can be had to the aforedescribed embodiment 60 without departing from the spirit of the invention. For example, although the head end 64 of the aforedescribed embodiment 60 of FIGS. 4-6 has been shown and described as being shaped (e.g. provided with six side surfaces 65*a*-65*f*) to cooperatively accept the open, or working, end 81 of a socket 80 when the socket 80 is positioned thereover, the head end 64 could take an alternative form. For example, there is depicted in FIGS. 7 and 8 a pulling eye 90 having an elongated body 92 having a clevis-shaped head end 94 having a pair of spaced-apart tangs 98, 100 which extend longitudinally of the body 92. Extending from the body 92 opposite the head end 94 is a tapered portion 95 having a plurality of threads 97 which spiral along the length of the tapered portion 95. As is the case with the clevis-shaped head 64 of the pulling eye 60 of FIGS. 4-6, the head end 94 of the pulling eye 90 includes a pin 104 which extends through aligned openings provided through the spaced-apart tangs 98, 100 for securing the pin 104 to the head end 94. Between the tangs 98, 100 is defined a flat, or shoulder, surface 102 which faces longitudinally of the body 92 (and in the same direction as do the tangs 98, 100), and defined within the flat surface 102 is a hexagonal recess 106 adapted to accept the working end, or tip 109, of an allen head wrench 108. The allen head wrench 108 has a head end 111 which is, in turn, adapted to be rotated by the rotatable shaft 113 of a rotating power tool, such as battery-powered impact tool 110 depicted in FIG. 7.

It follows that by positioning the working end 109 of the allen head wrench 108 within the hexagonal recess 106 of the pulling eye 90 and then rotating the allen head wrench 108 (by way of the power tool 110) in one rotational direction (e.g. clockwise about the longitudinal axis of the body 92 of the pulling eye 90), the threads 97 of the tapered portion 95 of the pulling eye 90 are screwed into the interior of a conduit, such as the conduit 75 of FIG. 6 desired to be pulled with the pulling eye 90, and by subsequently rotating the allen head wrench 108 (by way of the power tool 110) in the opposite rotational direction (e.g. counter-clockwise about the longitudinal axis of the body 92 of the pulling eye 90), the threads 97 of the tapered portion 95 are thus unscrewed from, and thereby freed from, the interior of the conduit desired to be pulled with the pulling eye 90. Accordingly, the aforedescribed embodiments 60 and 90 are intended for the purpose of illustration and not as limitation.

The invention claimed is:

1. A pulling eye for use when pulling conduit of small diameter through a conduit of larger diameter, the pulling eye comprising:
    an elongated body having a head end and an externally-threaded tapered section opposite the head end which, when threaded into an end of the conduit of small diameter, effects the biting of the external threads of the tapered section into the interior walls of the conduit of small diameter; and
    the head of the pulling eye being configured to cooperatively interfit with the working end of a rotating power tool to facilitate the attachment of the pulling eye to and the removal of the pulling eye from the conduit of small diameter.

2. The pulling eye of claim 1 wherein the head end of the pulling eye is shaped to accept a socket tool positioned thereabout.

3. The pulling eye of claim 1 wherein the head end of the pulling eye possesses a cross-section of substantially hexagonal shape for closely accepting the interior of a socket tool directed thereover so that as the socket tool is rotated about its longitudinal axis, the head end of the pulling eye is rotated as well.

4. The pulling eye if claim 1 wherein the head end of the pulling eye includes a recess which opens axially of the elongated body and in a direction opposite the tapered section of the elongated body and which is adapted to accept the working end of an allen head wrench.

5. The pulling eye as defined in claim 1 wherein the head end of the pulling eye is clevis-shaped having a pair of spaced-apart tangs which extend longitudinally of the elongated body and in a direction opposite the tapered section thereof.

6. A pulling eye for use when pulling conduit of small diameter through a conduit of larger diameter, the pulling eye comprising:
    an elongated body having a head end an externally-threaded tapered section opposite the head end which, when threaded into an end of the conduit of small diameter, effects the biting of the external threads of the tapered section into the interior walls of the conduit of small diameter and thereby joins the pulling eye to the conduit of small diameter for the purpose of pulling the conduit through a conduit of larger diameter by way of the pulling eye; and
    the head of the pulling eye being configured to cooperatively interfit with the working end of a rotating power tool to facilitate the attachment of the pulling eye to and the removal of the pulling eye from the conduit of small diameter by way of the rotating power tool.

7. The pulling eye of claim 6 wherein the head end of the pulling eye is shaped to accept a socket tool positioned thereabout.

8. The pulling eye of claim 6 wherein the head end of the pulling eye possesses a cross-section of substantially hexagonal shape for closely accepting the interior of a socket tool directed thereover so that as the socket tool is rotated about its longitudinal axis, the head end of the pulling eye is rotated as well.

9. The pulling eye of claim 6 wherein the head end of the pulling eye includes a recess which opens longitudinally of the elongated body and which is adapted to accept the working end of an allen head wrench.

10. The pulling eye as defined in claim 1 wherein the head end of the pulling eye is clevis-shaped having a pair of spaced-apart tangs which extend longitudinally of the elongated body and in a direction opposite the tapered section thereof.

11. A pulling eye for use when pulling conduit of small diameter through a conduit of larger diameter, the pulling eye comprising:

an elongated body having a head end and an externally-threaded tapered section opposite the head end which, when threaded into an end of the conduit of small diameter, effects the biting of the external threads of the tapered section into the interior walls of the conduit of small diameter; and the head of the pulling eye being configured to cooperatively interfit with the working end of a rotating power tool so that rotation of the power tool in one rotational direction and about the longitudinal axis of the elongated body effects the rotation of the elongated body about the longitudinal axis of the elongated body by a corresponding amount to facilitate the attachment of the pulling eye to and the removal of the pulling eye from the conduit of small diameter.

* * * * *